United States Patent Office 3,313,160
Patented Apr. 11, 1967

3,313,160
REMOTE METER READING SYSTEM
David A. Goldman, Croton Heights Road, Box 69,
R.F.D. 1, Yorktown Heights, N.Y. 10598
Filed June 29, 1964, Ser. No. 378,499
3 Claims. (Cl. 73—432)

This invention relates generally to a system for obtaining the readings of a plurality of remotely located measuring devices. More particularly, the present invention relates to a system for obtaining the readings of household or industrial type utility meters at a central location by the transmission and reception of information via enclosed fluid carrying lines, e.g. water and gas lines, which service the locations at which the utility meters are installed.

The present invention will be more completely understood by reference to the drawing which shows in FIGURE 1 a schematic representation of a system in accordance with the present invention employed in conjunction with units, such as private homes, apartments, factories and the like which are serviced by a common enclosed fluid carrying line such as a water main or gas line.

FIGURE 2 shows a somewhat schematic representation of a sonic energy transducer suitable for use in the system of the present invention.

Figures 1, 2:
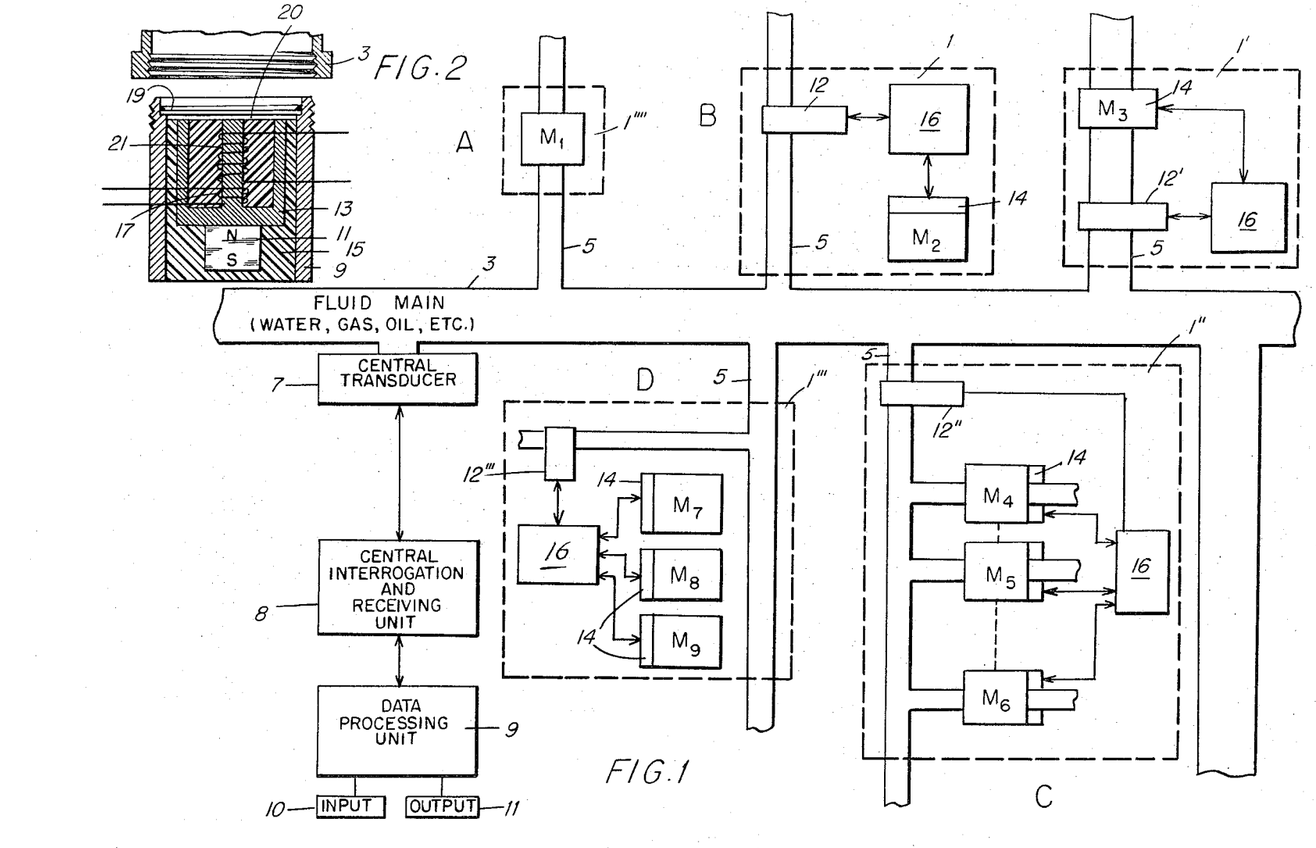

With reference to FIGURE 1, the numbers 1, 1', 1", 1''' and 1'''' refer to units, or stations, serviced by a common enclosed fluid main 3 through branches 5. Fluid main 3 can be a water or gas main and remote stations 1, 1', etc. can for example be household dwellings which are serviced by fluid main 3 via branches 5. As indicated, each of the stations 1, 1', etc. have one or more utility meters $M_1$–$M_9$ such as for measuring water, gas and electricity. These meters can conveniently be of the standard type having dials and rotating pointers; however, other types of read-out devices are also compatible with the present invention.

In conjunction with the foregoing arrangement, a system is provided which includes a central transducer 7 which is coupled to the fluid main 3 at a suitable location referred to herein as the central station. The use of the term central is not intended to imply a physical location with respect to the meter-containing stations 1, 1', etc., although this might be desirable, but rather a central location as to the transmission and reception of information.

Central transducer 7 is a sound or sonic energy transmitting device which is adapted to be actuated to provide mechanical vibration at a predetermined frequency and for a predetermined interval. A somewhat schematic representation of a suitable transducer is shown in FIGURE 2.

With reference to FIGURE 2, a housing 9, which can suitably be constructed of cast iron encloses a permanent magnet 11 shown in contact with a pole piece 13 formed of a suitable ferromagnetic material such as transformer steel. Magnet 11 and pole piece 13 are rigidly supported in housing 9, for example, by a plastic potting compound as shown at 15.

In a transmitting mode of operation, electrical energy, at a suitable frequency, is applied to coil 17 and as a result, pole piece 13 develops a strong alternating magnetic field which interacts with the field of magnet 11 and causes a displacement of diaphragm arrangement 19 having a definite relationship to the applied frequency. The displacement frequency can be the same as the applied electrical frequency or it can be made to be a different frequency by using techniques known to the art, it only being necessary that there be a definite relationship between the two frequencies. The displacement of the diaphragm 19, which is formed of a ferromagnetic material, e.g. iron or steel, and separated from pole piece 13 by air gap 20 as shown, develops a sonic energy transmission in the fluid main 3, which is suitably coupled to the transducer as shown.

In a receiving mode of operation, sonic energy vibrations in the fluid main develop a physical displacement of diaphragm 19 which causes a variation in the air gap 20 between diaphragm 19 and pole piece 13, thus causing an electrical signal representative of the sonic energy vibrations to be developed in coil 21.

The transducer of FIGURE 2 can thus be seen to be capable of both transmitting and receiving sonic energy vibrations representative of electrical signals. However, it is to be understood that separate transmitting and receiving devices can be used in place of the transducer of FIGURE 2.

Referring again to FIGURE 1, the aforedescribed or other suitable type of sonic energy transducer 7 is coupled to fluid main 3 at a suitable location which can for example be adjacent a hydrant valve or other accessible portion of a fluid main.

As shown in FIGURE 1, transducer 7 is electrically connected to a central station interrogation and receiving unit 8 which in turn is connected via a suitable communications link to a digital data processing unit 9 having input and output units 10 and 11.

In the present invention, only transducer 7 need be physically located at the fluid main. Central interrogation and receiving unit 8, which for example can comprise well-known amplifier and logic circuitry and analog-to-digital conversion circuits can be located at the central station, or arranged in a mobile unit, or located at a data processing billing center, it only being necessary that a suitable link be provided with the transducer.

Data processing unit 9 which can comprise data storage and buffer equipment can also be arranged at any convenient location. Likewise, input and output devices 10 and 11 which can for example be punched card or tape systems used in conjunction with printers are arranged at any suitable location.

In operation, the central station is provided with appropriate instructions such as the identification of a particular remote station 1, 1', 1", etc., which, as indicated in FIGURE 1, are coupled to fluid main 3 via remote transducers 12, 12', 12", etc. Remote transducers 12, 12', etc., are similar in operation to the central transducer 7 and the device illustrated in FIGURE 2.

By virtue of instructions received at the central station, by way of data processing unit 9, central transducer 7 transmits coded sonic energy into fluid main 3 and through the fluid therein to the remote stations. From the simplest point of view, the central transducer 7 can transmit a series of audio frequency (e.g. 1000 c.p.s.) sonic energy pulses with the number of pulses indicating the identity of the remote station. The sonic energy pulses are received at the remote stations 1, 1', 1", etc., and the respective remote transducers convert the sonic energy into electrical pulses which are fed to the associated remote receiving and transmitting units 12, 12', 12", etc.

Upon proper identification being established at a particular remote receiving and transmitting unit (e.g. indicated by the number of pulses), electrical signals corresponding to the meter readings at the particular remote station are fed from its respective read-out unit 14 to the associated remote receiving and transmitting unit 16. From an elementary point of view, the electrical signals can be a series of audio frequency range pulses, the number of which correspond to a meter dial reading.

The electrical signals, corresponding to a meter reading, are then suitably applied to the associated remote transducers 12, 12′, 12″, as the case may be, which converts the electrical signals to pulses of sonic energy at a suitable frequency which are introduced into the fluid in conduit 3. The sonic energy signals thus developed are received at central transducer 7, converted to electrical signals at the central station, and suitably processed and recorded.

By way of illustrating the versatility, evolutionary capacity and non-interfering nature of the present invention, the letter A indicates a dwelling for example which is not coupled to the system of the present invention and is in no way affected thereby. However, the station at A can be easily incorporated in the system merely by making a relatively simple installation only at the station A. The letter B indicates a dwelling at which is obtained the remote reading of a meter which does not measure the fluid distributed by main or conduit 3; C indicates the remote reading of multiple meters, which measure fluid distributed by main 3; and D indicates the remote reading of multiple meters, none of which measure the fluid distributed by main 3.

All of these foregoing exemplary arrangements require the installation of only a single transducer at any given remote station and hence show the economy of the system of the present invention. A particular advantage of the present invention is that the sonic energy transmission need not be "line-of-sight." That is, the presently disclosed method can be used so long as there is a common enclosed fluid-filled conduit connecting the control and remote stations, regardless of bends and changes in direction.

The present invention will be more fully understood by a description of a preferred embodiment which is illustrated in the schematic and circuit diagrams of FIGURES 3 through 7 and in the time diagrams of FIGURES 8, 9, 10 and 11. While these figures show only one meter at one remote station, it is to be understood that additional meters and remote stations can be readily accommodated.

Figure 3:
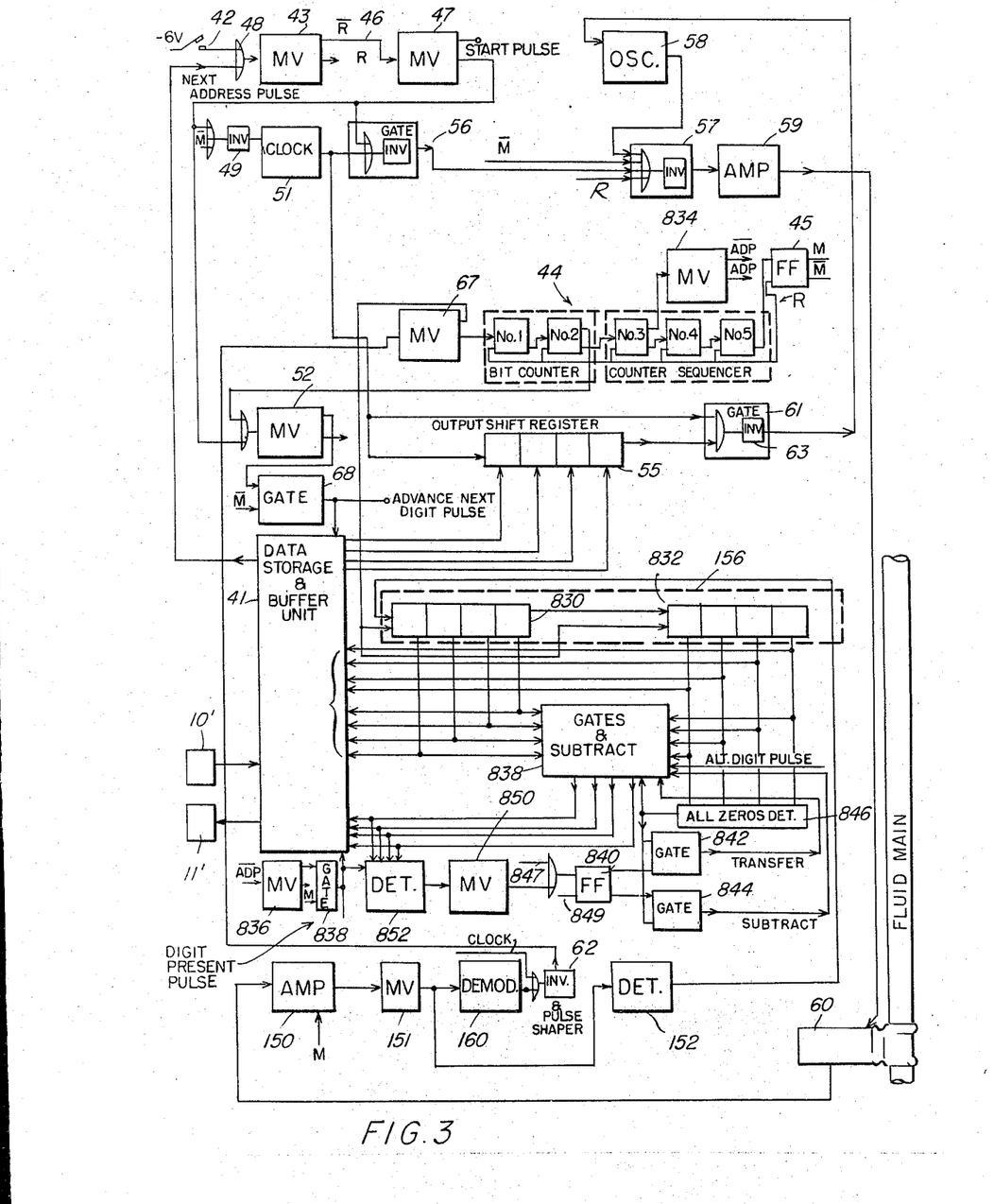
FIGURE 3 shows a diagram of a preferred arrangement of transmitting, receiving and associated equipment for interrogating a remote meter-containing location and for receiving information from the meter-containing station.

With reference to FIGURE 3, which schematically represents suitable central station equipment shown generally as 8, 9, 10 and 11, in FIGURE 1, a suitable input device 10′, which can be punched card equipment, is provided to communicate the addresses of a remote station to data storage and buffer unit 41. By way of example 7064 is chosen as the address of a remote station in conjunction with the time diagrams of FIGURES 8 et seq. and the exemplary code indicated in FIGURE 7a. An interrogation cycle is initiated by the closure of advance first address switch 42.

The closure of switch 42 triggers one-shot multivibrator 43 which produces a negative going reset pulse R which is applied at counter 44 and mode flip flop 45 to place the central station logic circuitry in an appropriate start condition. Reset pulse R is applied elsewhere for purposes hereinafter more fully explained.

After closure of switch 42, when the inverted output 46 of multivibrator 43 goes negative, a relatively long negative Start Pulse is developed by one-shot multivibrator 47.

Figure 8:
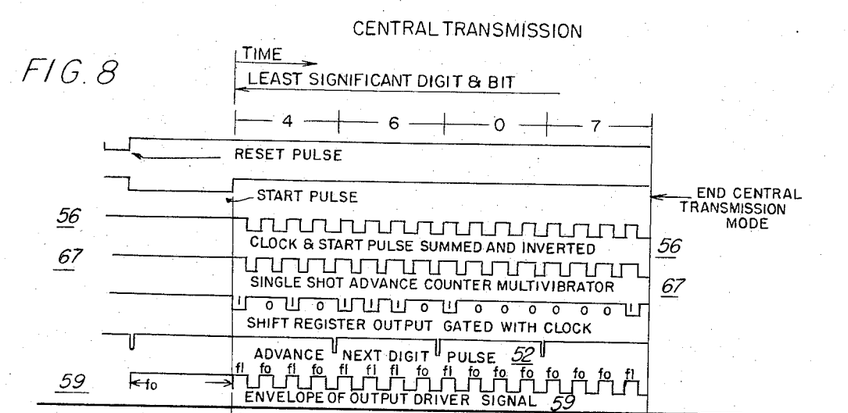
FIGURES 8, 9, 10 and 11 are time diagrams showing exemplary signals which are derived in the operation of the equipment of FIGURES 3 through 7.

This Start Pulse, and also the Reset Pulse, are indicated in the time diagram of FIGURE 8. The Start Pulse drives OR inverter gate 49 positive which inhibits clock 51, a free running multivibrator, for the duration of the Start Pulse. The Start Pulse also triggers advance digit multivibrator 52 (in the first instance this is the first digit) thereby instructing the data storage and buffer unit 41 to parallel transfer the first address digit for the given remote station address to the output shift register 55. With the point 56 positive during the Start Pulse, as shown in the time diagram of FIGURE 8, and with the reset pulse R, and the output $\overline{M}$ of mode flip flop 45 applied to gate 57, as shown, variable oscillator 58, which normally provides a continuous signal at a convenient frequency $f_0$, (e.g. 1300 c.p.s.) has its output gated to output driver amplifier 59 and thus actuates driver amplifier 59 to produce a burst, i.e. pulse, at a carrier frequency $f_0$, for the duration of the Start Pulse, as shown in the time diagram of FIGURE 8. Also, as shown by 56 in the time diagram of FIGURE 8, clock 51 remains inhibited during this initial burst of $f_0$. The output of driver amplifier 59 is connected to transducer 60 (suitably of the type illustrated in FIGURE 2) and consequently a burst, i.e. pulse of sonic energy at frequency $f_0$ or a suitable frequency representative thereof is transmitted through the fluid in fluid main 3.

Figure 4:
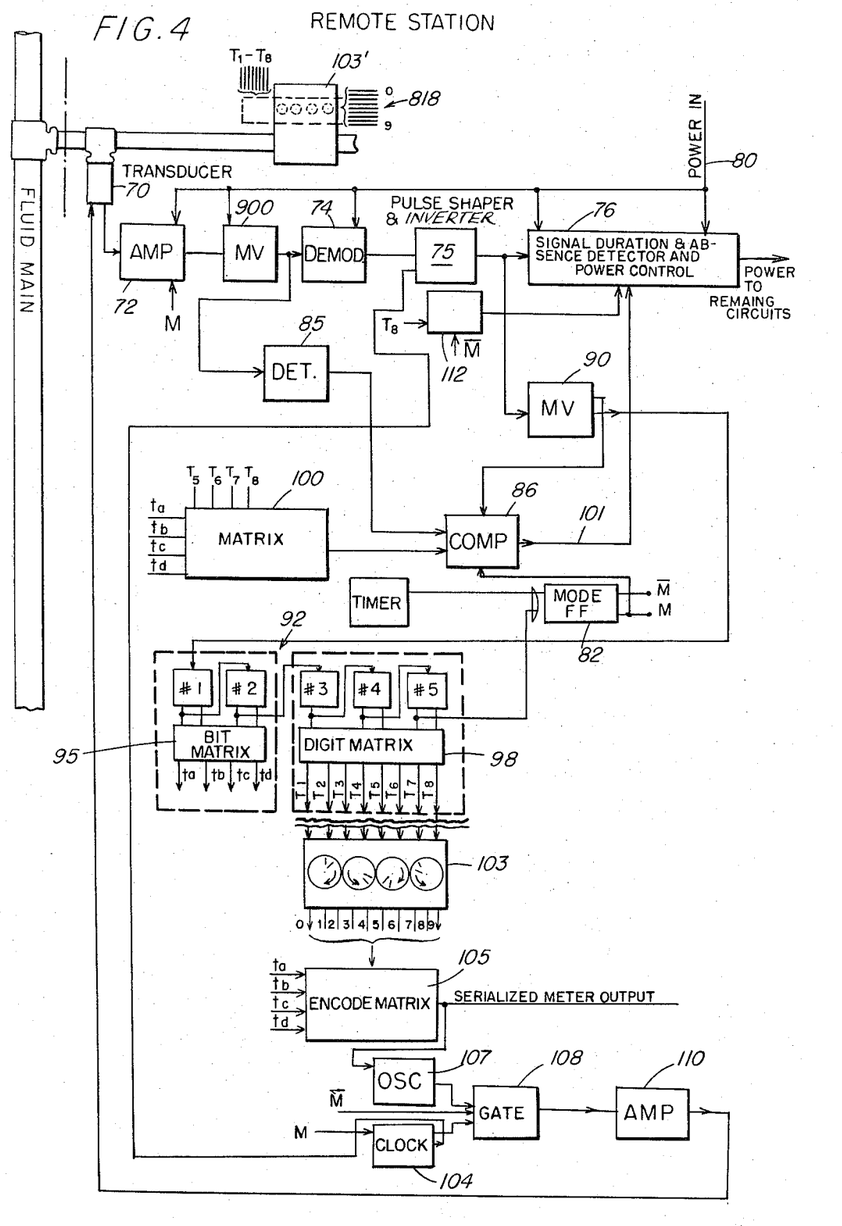
FIGURE 4 shows a diagram of receiving and transmitting equipment at a meter-containing station for use in conjunction with the equipment of FIGURE 1.
Figure 5:
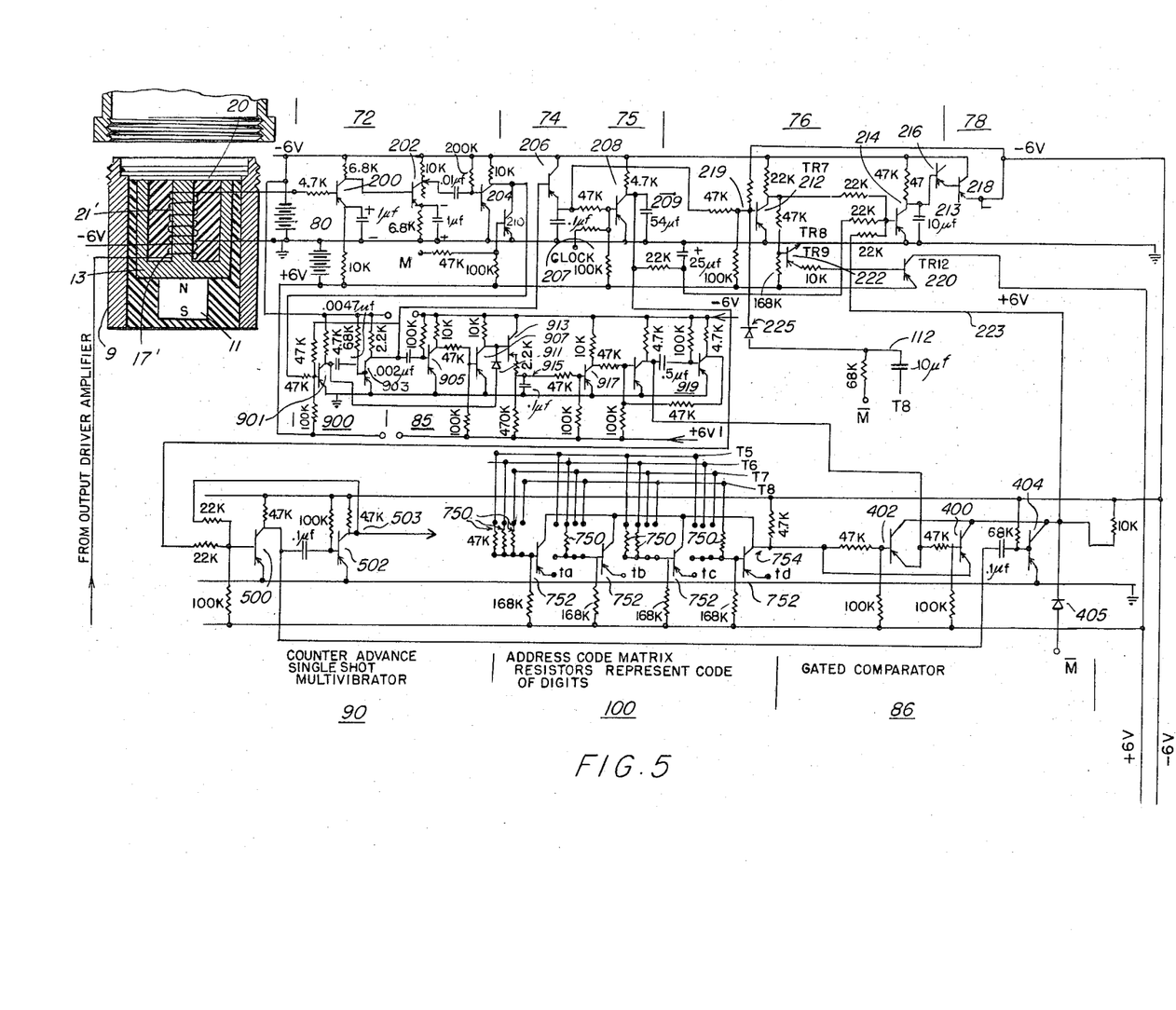
FIGURES 5, 6 and 7 show more detailed schematics of the equipment at the remote meter-containing stations
Figure 6:
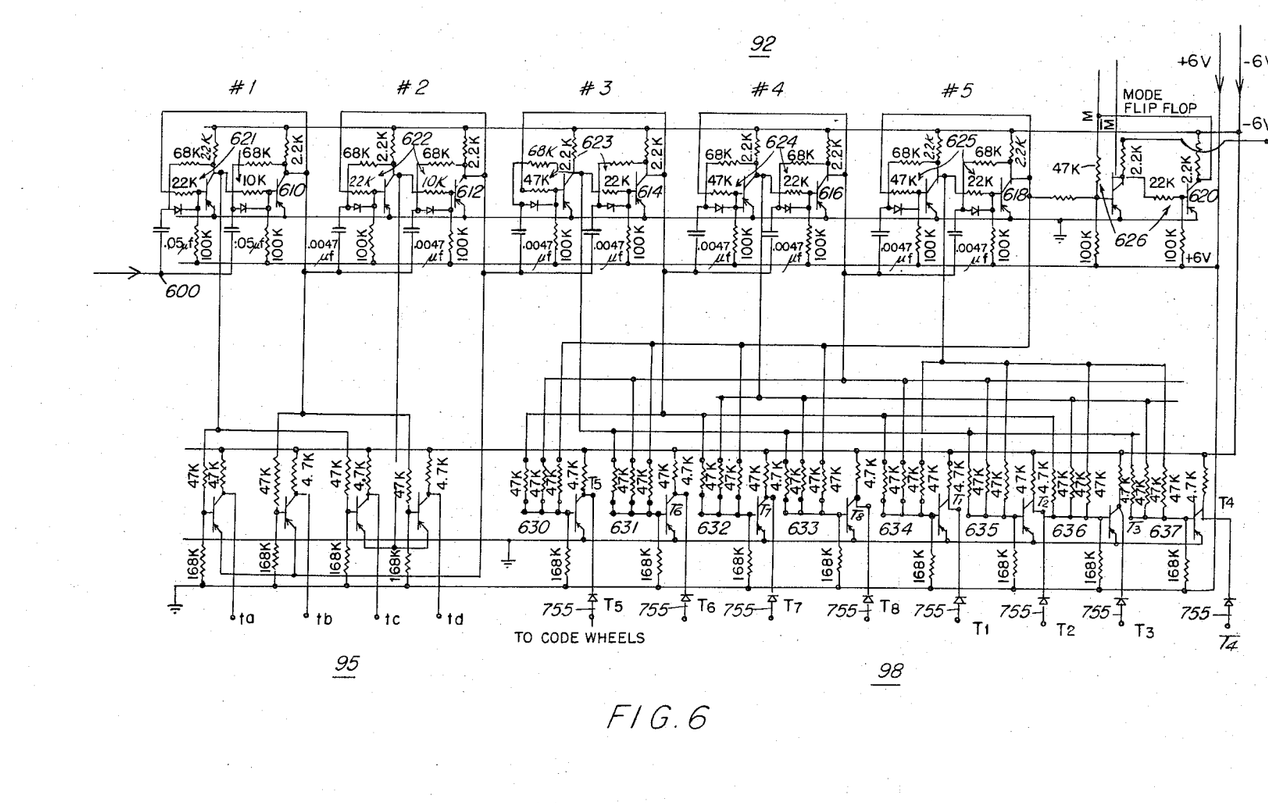
Figure 7:
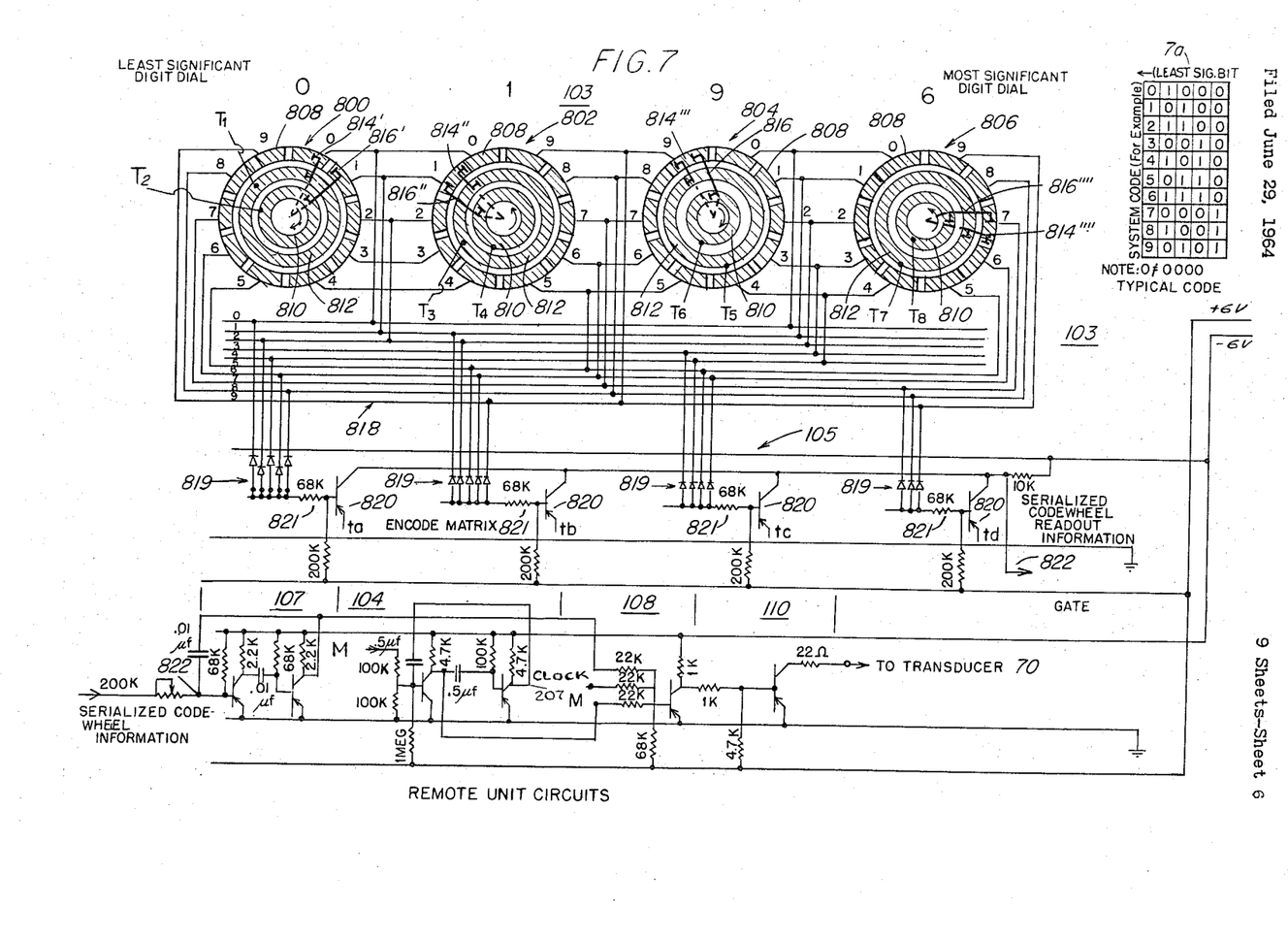

This sonic energy burst corresponding to frequency $f_0$ is detected at various remote stations, a single one of which is schematically illustrated in FIGURE 4 and with more detail in FIGURES 5, 6 and 7. The remaining remote stations are similarly instrumented in accordance with their respective identifications, i.e. addresses.

Referring again to FIGURE 3, during the Start Pulse period, the first address digit is encoded and transferred from data storage and buffer unit 41 to output shift register 55 in order that, at the end of the Start Pulse, the first bit for transmission to the remote stations is present in the output of output shift register 55.

Since upon completion of the Start Pulse, "OR" gate 49 goes negative, clock 51 is no longer inhibited and goes negative at the end of the Start Pulse. When a ONE is present in the output of output shift register 55, "AND" gate 61 goes negative, the output is inverted at 63, and applied as shown to variable oscillator 58, e.g. a free running multivibrator, which normally (i.e. with its input negative) oscillates at $f_0$, e.g. 1300 c.p.s., and serves as a two-frequency source and switches to a frequency $f_1$, e.g. 1000 c.p.s., when its input becomes positive. Consequently, upon completion of the Start Pulse, during which frequency $f_0$ was transmitted, clock 51 times the duration of oscillations which are applied to transducer 60 (by way of driver amplifier 59) providing a frequency corresponding to $f_1$ if a ONE is in the output of Output shift register 55 when gated with the inverted output of clock 51. A frequency of $f_0$ is applied to driver amplifier 59 when the output is a ZERO. An exemplary shift register output and driver amplifier (and hence transducer 60) output are illustrated in the time diagram of FIGURE 8 using the System Code set forth in FIGURE 7 for an address of 7064.

In addition to the foregoing, the output of the clock 51 is applied at OR inverter and pulse shaper 62, the output of which is applied to advance the output shift register 55, and counter 44, by way of single shot advance counter multivibrator 67.

After four clock pulses the output of the second stage of binary counter 44 is applied to advance digit multivibrator 52 to produce an advance next digit pulse which is also shown in the time diagram of FIGURE 8. This pulse is transferred via gate 68 to data storage and bufer unit 41 which then transfers the second address digit to output shift register 55 and a burst of sonic energy, at a frequency corresponding to $f_0$ or $f_1$ depending on whether the output of output shift register 55 is ONE or ZERO, is transmitted by transducer 60. A cycle of four bits (one digit) parallel transfer, serial shift, oscillator control ($f_0$ or $f_1$) and sound burst transmission is repeated until the four digits of the address are transmitted. When the four digits have been transmitted, the fifth stage of counter 44 is applied to change the state of mode flip flop 45, to that which corresponds to the Receiving Mode, causing M to be positive. The central station equipment, under these conditions, is thus in the Receiving Mode and ceases transmission to await a response from the remote station which has been addressed.

At the remote station, with reference to FIGURES 4 and 5, the sonic energy transmission is received via the fluid in the fluid main at transducer 70, and an electric signal is developed in coil 21' corresponding in frequency to the sonic energy bursts, i.e. $f_0$ or $f_1$. The transducer is suitably of the type illustrated more particularly in FIGURE 2, which is used for both transmitting and receiving.

As shown in the drawing, the signal developed in transducer coil 21' is fed to high pass amplifier 72 which is designed to filter out frequencies below those used for transmission.

High pass amplifier 72, demodulator 74, pulse shaper and inverter 75, signal duration and absence detector and power control unit 76 and incoming signal shaper multivibrator 900 are at all times connected to power source 80 which is suitably batteries but which can be other sources as well.

In its normal state mode flip flop 82 (shown in FIGURE 6) is in the Receive Mode and provides signals M and $\overline{M}$ which are applied as shown in FIGURE 4.

Figure 9:
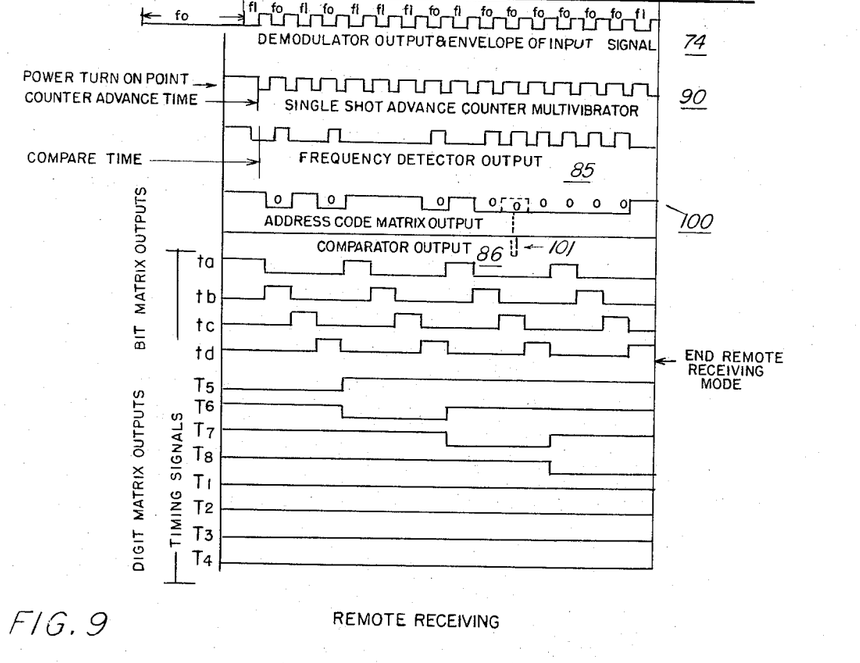

Referring to FIGURE 4 and the time diagram of FIGURE 9, when the Start Pulse corresponding to $f_0$ is received via the fluid in the fluid main at transducer 70, converted to an electrical signal at frequency $f_0$, and demodulated, the duration is measured by signal duration and absence detector and power control unit 76. Positive power is caused to be applied at once to the circuitry at the remote station; however, negative power is not turned on until the signal has persisted for a predetermined interval, so as to discriminate against spurious signals. Once the negative power is turned on, appropriate flip flop circuitry in the unit 76 keeps the power on until a sufficiently long predetermined period has elapsed in which no signal is received.

With both the positive and negative power turned on, the binary counters and various flip flops in the remote station circuitry are set to their proper state for the Receive Mode as hereinafter more fully described and when a frequency $f_1$ is received by frequency detector 85, a signal corresponding to a ONE is applied to comparator 86; and when the frequency $f_0$ is received at frequency detector 85, a ZERO is applied to comparator 86.

Referring particularly to FIGURE 4, subsequent to the Start Pulse, the output of pulse shaper and inverter 75 triggers advance counter single shot multivibrator 90 and counter 92 is advanced. The first and second stages of the counter 92 serve as a bit counter and the outputs are connected to bit matrix 95 to provide the successive positive going bit pulse, $ta$, $tb$, $tc$ and $td$ which are indicated in the time diagrams of FIGURES 9 and 10. The third, fourth and fifth stages of counter 92 are connected to digit matrix 98 to provide outputs T1–T8 which go negative for respective digit periods also as shown in the time diagrams of FIGURES 9 and 10.

In the first instance, i.e. when the remote station is in the Receive Mode, the outputs $ta$–$td$ and T5–T8 are applied to address code matrix 100 in which is stored the address of the particular remote station, e.g. 7064. As a result, the stored address is serialized and applied to comparator 86. If the first bit in the signal from frequency detector 85 compares successfully (when gated for a short interval as advance counter multivibrator goes negative) with the first bit from the address code matrix 100, i.e. the polarities are different, the counter 92 is allowed to advance by single shot advance counter multivibrator 90 when its output goes positive. If however the signals do not compare, comparator 86 provides a signal as shown at 101 which turns off the power to the remote station circuitry.

As long as successful comparisons are made, the advance counter multivibrator 90 advances counter 92 and, as the output of the fifth counter stage goes negative, mode flip flop 82 is set to the Transmission Mode whereby inhibiting signals are applied to the output of amplifier 72 and comparator 86 and removed from clock 104 and gate 108.

Figure 10:
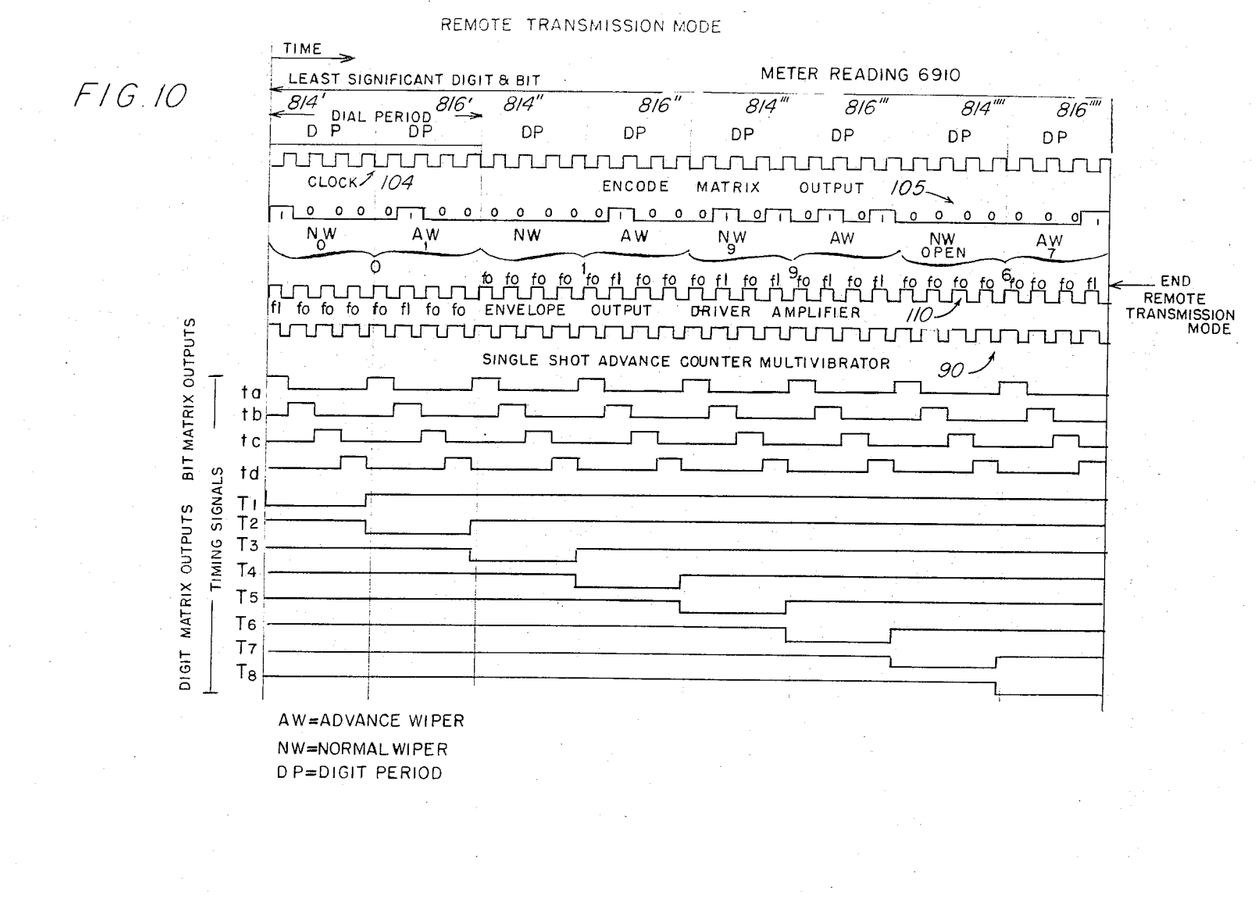

In the Transmission Mode, at the remote station, as in the Receive Mode, advance counter multivibrator 90, triggered by clock 104, via pulse shaper and inverter 75, advances counter 92 and the stages of the counter 92 provide signals for bit matrix 95 and digit matrix 98 to provide pulses $ta$–$td$ and T1–T8 as shown in the time diagrams of FIGURES 9 and 10.

The pulses T1–T8 are applied as shown in FIGURES 4 and 7 to code wheel arrangement 103 which is engaged with the dial pointers of a meter at the remote station as hereinafter more fully described. The pulses $ta$–$td$ are applied to encode matrix 105, as are the pulses T1 through T8 which are transmitted via code wheel arrangement 103, and which correspond to the positions, i.e. readings, of the meter dials.

The aforementioned pulses are serialized by encode matrix 105, using the exemplary code of FIGURE 7, to correspond to the meter reading and are applied as an input to variable oscillator 107 which provides an output frequency of $f_0$ except when the input from encode matrix 105 is a ONE, in which case the frequency is changed to $f_1$. The output of variable oscillator 107 and the output of clock 104, which is started when the remote station is in the Transmission Mode, are gated as shown at 108 and applied to transducer 70 by way of driver amplifier 110.

Consequently, the meter reading at the remote station is transmitted through the fluid main back to the central station in the form of bursts or pulses of a carrier frequency corresponding to $f_1$ and $f_0$ which signify a ONE or a ZERO, respectively. As shown in FIGURE 4 and represented in the time diagram of FIGURE 10, pulse T8 is applied through a suitable gated differentiator 112 whereby power is turned off at the remote station by the trailing edge of pulse T8 in the Transmission Mode.

Figure 11:
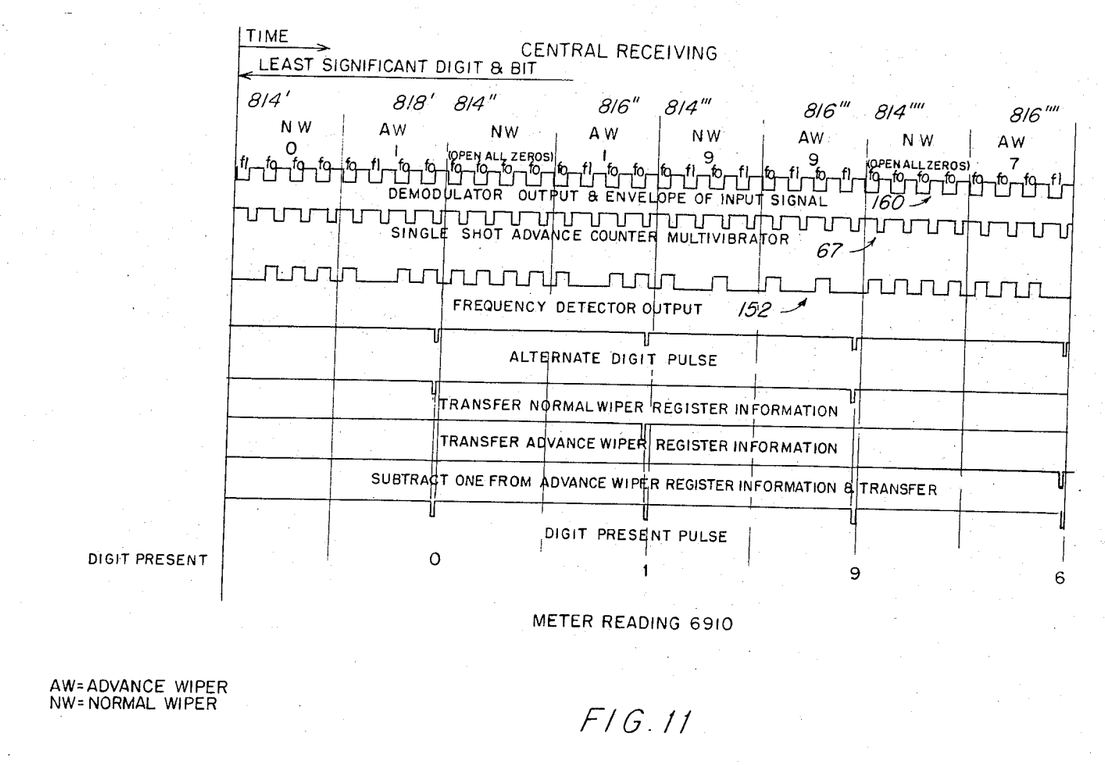

Referring again to FIGURE 3 and the time diagram of FIGURE 11, the coded sonic energy transmission corresponding to the exemplary meter reading 6910 at the remote station is received via the fluid main at transducer 60 where it is converted into electrical pulses representative of frequencies $f_1$ and $f_0$.

The pulses are amplified at high pass amplifier 150 and are applied to multivibrator 151 for shaping and then to frequency detector 152, which, if $f_1$ (ONE), causes frequency detector 152 to provide a negative signal at its output; and if $f_0$ (ZERO), provides a positive signal.

The output of frequency detector 152 is applied to incoming information shift register 156, transferred to data storage and buffer unit 41 and ultimately recorded by output device 11' which is suitably a printer. The incoming information register 156 is advanced by single shot multivibrator 67 which is triggered by the signal derived from demodulator 160.

The provision of advanced wiper shift register 830 and normal wiper shift register 832, as indicated in FIGURE 3, is not a requirement in all embodiments of the present invention but is a highly advantageous arrangement for situations involving the reading of a dial meter wherein ambiguous pointer settings are encountered.

This will be more fully appreciated in view of the more detailed description of the circuitry illustrated in the remaining figures of the drawing.

With particular reference to FIGURE 5 and the time diagrams of FIGURES 8–11, amplifier 72 which receives electrical pulses at frequencies $f_0$ and $f_1$, is seen to comprise three transistors 200, 202, and 204. Transistors 202 and 204 with their associated circuitry form an amplifier having a low frequency rejection characteristic which blocks low frequencies, e.g. 60 c.p.s. and 120 c.p.s., that are likely to be present in the vicinity of utility meter installations. Transistor 204 is saturated in its normal condition and so remains until rapidly going positive signals occur at the collector of transistor 202 under which circumstances transistor 204 is cut off for a time interval of one-half the period of the applied pulse. The signal developed at the output of transistor 204 is a clipped signal which is applied to transistor 901 of the incoming signal shaper multivibrator 900, the output of which is applied to transistor 206 in the circuit of demodulator 74 and produces an output corresponding to the incoming pulses of $f_1$ and $f_0$ as shown in the time diagram of FIGURE 9.

The demodulated output of transistor 208 of the pulse shaper and inverter 75 produces a bit pulse 10–50 times the width of the period of the incoming pulses. Transistor 210 keeps the input to transistor 206 grounded when the output 207 of clock 104 (shown more particularly in FIGURE 7) controls the output of the pulse shaper and inverter 75 while the remote station is in the Transmission Mode. As a result, the output 209 of the pulse shaper and inverter 75 goes positive at the start of each bit period in both the Transmission and Receiving Mode of the remote station.

When a Start Pulse is received at transistor 200, the output of transistor 206 in the demodulator 74 goes negative for a suitably long interval and is applied to the input of transistor 212 in the circuit of signal duration and absence detector 76. The output of transistor 212 goes positive (ground) and the condenser 213 connected to the collector of transistor 214 slowly builds up a negative charge. Two emitter followers, transistors 216 and 218, follow the output of transistor 214 and thereby supply negative power to the remote station circuits. When the negative power voltage reaches a suitable level, current is fed back at 219 to the base of transistor 212 locking the power on. Positive power is turned on at transistor 220 via transistor 222 without any delay.

Negative power can be turned off by (1) a signal at 223 derived as a non-comparison pulse from comparator 86 in the remote station receiving mode (2) a signal at 225 derived from gated differentiator 112 at the end of the remote station Transmission Mode (3) by the presence of a persistent negative signal at the collector of transistor 209 which corresponds to no incoming signal.

The output of the incoming amplifier 72, at the collector of transistor 204, is applied to incoming signal shaper multivibrator 900 at transistor 901 to suitably sharpen the incoming signal and produce an output signal virtually independent of the amplitude of the incoming signal. The output of multivibrator 900 at transistor 903 will have different wave shapes for input signals of $f_1$ (ONE) and $f_0$ (ZERO).

The output of multivibrator 900, at the collector of transistor 903, is applied both to the base of transistor 206 in the circuit of demodulator 74 and to the input of frequency detector 85 at transistor 905. Both demodulator 74 and frequency detector 85 require at least several carrier, i.e. $f_1$, $f_0$, cycles in order to respond in view of the time constants employed in the circuits.

The output of the time reference circuit at transistor 905 of frequency detector 85 is inverted and gated at the collector of transistor 907 with the inverted output of multivibrator 900 via diode 911. This gated signal is applied to an integrator type circuit comprising transistor 913 and the output at 915 goes negative when $f_1$ (ONE) is received, and also when no carrier frequency is received, and positive when $f_0$ (ZERO) is received.

The output at 915 is inverted at the collector of transistor 917 which in turn is applied to single shot multivibrator 919 which is employed to ensure that the output of frequency detector 85 remains at the proper polarity long enough for a comparison to be made at comparator 86.

Frequency detector 152 at the central station is suitably of the same type as just described.

The output of the frequency detector 85 is applied as shown to the base circuit of transistor 400 and emitter of transistor 402 in comparator 86. Address code matrix 100 which receives inputs $ta$–$td$ and T5–8 as hereinafter more fully explained, also provides an input to comparator 86 at the base circuit of transistor 402 and emitter of transistor 400 with the result that if the signal from address code matrix 100 compares with the signal from frequency detector 85 (i.e. they are of different polarities) the output of the comparator 86, at the collector of transistor 404, remains positive. If there is a non-compare, the collector of transistor 404 goes negative and is applied at 223 and turns off power at the remote station. The output of comparator 86 is connected via diode 405 to mode flip flop 82 whereby it is inhibited from going negative in the Transmission Mode but is allowed to function as aforementioned in the Receiving Mode.

Also as shown in FIGURE 5, advance counter multivibrator 90 comprising transistors 500 and 502 is triggered as the signal from pulse shaper and inerter 75 goes negative. The resulting positive output at 503 of advance counter multivibrator 90 is applied to the first stage of counter 92 at 600 as shown in FIGURE 6.

With reference to FIGURE 6, the stages of the counter 92 are standard binary circuits and flip flop 82 is the mode flip flop shown in FIGURE 4. The signal from advance counter multivibrator 90 advances the counter one by one and a signal from the fifth stage of counter 92 sets mode flip flop 82 at the end of the Receive Mode.

During the Start Pulse, when power at the remote station is turned on, as hereinbefore described, the mode flip flop 82 and the counter 92 are reset.

In the reset condition, the collectors of transistors 610, 612, 614, 616, 618 and 620 are positive (ground). This is accomplished by using different values for the cross-over resistors (resistors connecting collectors to bases) in the different transistors of the respective binary circuits as shown at 621–626. As the positive power is applied almost instantaneously the transistors in the binary stages and mode flip flop 82 remain cut off. Consequently, as the negative power increases (negatively) slowly, the transistors having the lower cross-over resistances connected to their bases will go into saturation and thus keep their respective companion transistors non-conducting.

As shown in FIGURE 6, the first and second binary stages which serve as a bit counter have their outputs connected to the circuit 95 which serves as the previously mentioned bit matrix and develops the positive going pulses $ta$–$td$ which are shown in the time diagram of FIGURES 9 and 10.

In operation when an emitter of a transistor in circuit 95 is positive and a negative signal is applied at the resistor connected to the base of the transistor, the collector of the transistor goes positive. Thus, in the arrangement shown, only one transistor of circuit 95 will go positive at each of the four possible states of the first and second binary stages thereby providing the successive pulses $ta$–$td$.

The third, fourth and fifth binary stages are connected respectively to eight gate circuits 630–637 as shown. The (T) gate outputs will go successively negative for successive digit periods in the order T5, T6, T7, T8, when negative power is first turned on. These pulses, with pulses $ta$–$td$, are applied in the remote station Receive Mode to address code matrix 100 as shown in FIGURES 4 and 5 to determine address correspondence as hereinafter more fully described.

When a successful address comparison is made, the mode flip flop 82 is set as the output of the fifth binary stage of counter 92 goes negative. The outputs T1–T8 now go successively negative in that order.

Referring again to FIGURE 5, it is seen that in the remote station Receive Mode inputs $ta$–$td$ (bits) and T5–T8 (digits), previously described, are applied to address code matrix 100 to serialize the stored address, e.g. 7064, wherein the address is designated by the number of resistors 750 located in the base circuits of the respective transistors 752 which correspond to bits in the address code.

With the collectors of transistors connected together as shown, and with reference to the time diagram of FIGURE 9, it is seen that if a T (digit) pulse is negative and a $t$ (bit) pulse is positive, and a resistor provides a path for the negative T (digit) pulse to the base of the transistors having a positive $t$ (bit) pulse, the collectors of transistors 752 all go positive (ground).

The output obtained at 754 therefore is the serialized stored adress code and is applied to the comparator 86 for comparison with the incoming address.

The signals $ta$–$td$ and T1–T8 are also used to serialize the meter reading at the remote station as will be more fully understood by reference to FIGURE 7. The signals T1–T8 are applied as shown through isolation diodes 755 to code wheel arrangement 103 to avoid "sneak" circuits.

FIGURE 7 shows a meter reading arrangement 103 comprising code wheels 800, 802, 804 and 806 each having electrically conductive segments 808 numbered 0–9 as shown. The code wheels also comprise inner slip rings 810 and outer slip rings 812, normal wipers 814 and advance wipers 816. As shown normal wipers 814 are arranged to connect segments 800 to the outer slip rings 812 and advance wipers 816 are arranged to connect segments 800 to inner slip rings 810. Also as shown, the wipers do not bridge the gap between the electrically conductive segments. In operation, the code wheels are mounted in line with the dials of a meter with the numbered segments in correspondence with the numbered dial scale.

The normal wipers 814 are geared to and correspond with the pointers of the respective dials and advance wipers 816 are spaced one half a segment arc ahead of the normal wipers.

As shown in FIGURE 7, signals T1, T3, T5 and T7 are applied to the respective outer rings 812 and signals T2, T4, T6 and T8 are applied to the respective inner rings 810.

The T (digit) pulses are thus applied to the normal wipers 814 and advance wipers 816 and, where these wipers are in contact with segments 800, negative signals are developed in lines 818 numbered from 0–9 as shown. The lines 818 are connected to transistors 820 of encode matrix 105 via diodes 819 and resistors 821 in an arrangement which encodes the signals from lines 818 into a four bit code in accordance with the exemplary System Code shown in FIGURE 7a.

As shown, the exemplary code of FIGURE 7a does not utilize an all zero condition. Because of the spacing therebetween, either a normal wiper 814 or an advance wiper 816 is in contact with a segment on each code wheel. This arrangement eliminates the possibility of an ambiguous meter reading in the event that a normal wiper 814 is between segments 808.

With reference to the time diagram of FIGURE 10, it can be seen that in the T1 period, the output of normal wiper 814' is serialized by pulses $ta$–$td$; and in the T2 period, the output of advanced wiper 816' is serialized. As signals T3–T8 are applied to the code wheels, the outputs of the other normal and advance wipers are serialized in a similar manner.

In FIGURE 7, the encoded meter reading at 822 is applied to free running multivibrator 107 which serves as a variable oscillator, which is gated at 108 with the inverted output of clock 104 and applied through output driver amplifier 110 to transducer 70 as shown.

The coded meter readings at the remote stations are thus transmitted through the Fluid Main servicing the remote station back to the central station.

With reference again to FIGURE 3 and the time diagram of FIGURE 11, the information received at the central station is amplified at 150, shaped at incoming signal shaper multivibrator 151, demodulated at 160, and a frequency determination made at 152, in a similar manner as at the remote station.

The information corresponding to the meter reading is received at the central station as thirty-two pulses or bits of frequency $f_1$ or $f_0$ in a sequence of four bits corresponding to a digit read by a normal advanced wiper 814, and four bits corresponding to a digit read by an advanced wiper 816 as shown in FIGURE 7. Depending upon the condition of frequency detector 152, either a ONE or a ZERO is applied to the advanced wiper shift register 830. The output of advanced wiper shift register 830 is applied to the normal wiper shift register 832.

In the Receiving Mode, the output of the demodulator 160 is applied to the OR inverter and pulse shaper 62, the output of which, when negative, triggers single shot advance counter multivibrator 67. The outputs of multivibrator 67 are applied to the first stage of counter 44 and to advanced wiper shift register 830 and normal wiper shift register 832 as shown to advance the registers.

After each two digit interval, the third binary stage of counter 44 creates a narrow alternate digit pulse (ADP) at multivibrator 834 which is applied at single shot multivibrator 836 to create a digit present pulse at 838 which serves to time the gating of the information from normal wiper shift register 832 or advanced wiper shift register 830 to the data storage and buffer unit 41.

If this information was a bona fide zero, corresponding to the exemplary code of FIGURE 7, and if the succeeding digit in the normal wiper register 832 represents an ambiguity (all zeros due to a wiper being between segments) then the information in advanced wiper register 830 is transferred directly to data storage and buffer unit 41.

The ambiguous "all zeros" condition is detected at ALL ZEROS gate 846 and applied as hereinafter described.

For example, if the preceding digit was not a zero, and if the succeeding digit in normal wiper register 832 represents an ambiguity, it is inferred that the preceding digit was a "nine." Consequently, "one" is subtracted at 838 from the information in the advanced wiper register 830 and the result is transferred to data storage and buffer unit 41. (If a "one" is subtracted from a "zero" the result is made a "nine.")

The transfer of information as aforedescribed is continued until the complete meter reading is applied to data storage and buffer unit 41 from whence it is transmitted to a suitable output device 11' such as a printer.

The elements specifically involved in the preceding operation in addition to those mentioned comprise zero code flip flop 840, gates 842 and 844 and All Zeros gate 846.

Zero code flip flop 840 is set by the Start Pulse at 847 and reset at 849 by the trailing edge of the digit present pulse from gate 838. When an ambiguous "all zeros" is detected at All Zeros gate 846, and when the previous information was a bona fide zero, gate 842 provides a signal which during digit present pulse time enables the transfer of the information from advanced wiper register 830 to data storage and buffer unit 41.

When an ambiguous "all zeros" is detected at All Zeros gate 846 and when the previous information was not a zero, then gate 844 provides a signal which causes a "one" to be subtracted from the information in advanced wiper register 830 and the result transferred to data storage and buffer unit 41 during digit present pulse time. Zero code flip flop 840, for the foregoing operations, is set to the appropriate output by the output signal from delay multivibrator 850 which stays negative longer than the digit present pulse and which is actuated by the output of zero code detector 852.

The aforedescribed circuitry representing a preferred embodiment is presented by way of example and is considered to represent a practical arrangement for use with present day and household and industrial meters. More simplified or more complex equipment known to the art can be used depending upon the particular circumstances.

However, with the arrangement of the aforedescribed, various significant advantages are obtained.

For example, when the particular address of a remote station is transmitted and received by several remote stations only the station at which the address compares will reply. Moreover, the power will be turned on at the non-addressed stations for only a short period of time.

Also, the disclosed meter-reading arrangement can be very easily adapted to existing meter installations without requiring alteration of the meters. This, in addition to the ability to resolve ambiguous dial settings is highly advantageous.

Further advantages accrue from the use of the aforedescribed two frequency, i.e. $f_1$, $f_0$, approach. For example, the envelope of the transmitted signal is used to establish the timing at the receiving station while the carrier frequencies, $f_1$, $f_0$, convey the information. Consequently, the speed of interrogation and response is much greater than systems using a single frequency wherein dual pulses, or modulation of the pulse is required. In the present invention, meters can be easily addressed and read at the rate of 1000 per hour.

As regards a pulse width modulation approach, the existence of sonic disturbances and reflections in the fluid main used as the transmission media would tend to render this technique unreliable at high interrogation rates. The two-frequency approach of the present invention, on the other hand, is not seriously affected in this respect.

Also, the two frequencies, $f_1$, $f_0$, can be relatively close so that transmission properties are substantially identical regardless of the fluid in the Fluid Main.

In addition, the two-frequency embodiment does not require the critical pulse spacing of dual pulse techniques and does not require the large, critical circuit components which are necessary in dual pulse operation.

Broad advantages of the present invention are:

(1) The information link, viz/water, gas lines, are in existence and are controlled by the parties interested in obtaining meter readings;

(2) Communications companies need not be involved in the operation although the system of the present invention, by being operable at audio frequencies, can use telephone and other links for directly relaying the meter readings from the central station to other locations;

(3) Communication link maintenance or service charges are not involved;

(4) There is no radio or television interference;

(5) Low voltage and low power can be used;

(6) Only the transducer element need be exposed to the fluid in the main;

(7) The present invention has evolutionary capacity in that only a few installations can be instrumented in an area initially without high re-fitting costs;

(8) Meters can be easily read at a rate of approximately 1000 per hour;

(9) A mobile central station can be used with the only fixed installation being a transducer connected to the fluid main;

(10) Meters can still be read visually even after installation of the present system.

In addition, it has been found that transmission of information via sonic energy in an enclosed fluid, i.e. in a fluid main, is remarkably effective. In an enclosed fluid, even when the enclosing conduit includes right angle changes in direction, the intensity of the pulsed sonic energy is essentially independent of its distance from the source, neglecting attenuation relating to dissipation due to viscosity and other small losses, whereas in an unconfined fluid the intensity varies inversely as the square of the distance from the source and the direct path from source to receiver must be essentially unobstructed.

On the other hand, in the present invention standard fluid main networks can be used as the communications link, requiring only relatively low power equipment and relatively low sensitivity receiving devices.

Further advantages of fluid main transmission of the present invention are due to the fact that temperatures therein are practically constant and hence the velocity of sonic energy transmission remains constant.

With the present invention, the meters in an area encompassing an entire housing development can be easily read and recorded at a central station located approximately in the middle of the area.

In a further embodiment of the present invention, the system can be arranged so that the respective remote stations transmit their meter readings to the central station at a predetermined time without requiring an interrogation from the central station.

By way of example, this can be accomplished by providing a conventional timer 95 as shown in FIGURE 4 which, at predetermined intervals, e.g. once a month, turns on the power at the remote station and sets the mode flip flop 82 to the transmitting mode and the meter reading is encoded and transmitted as before described.

Other arrangements can be used; however, the foregoing approach has the advantage of permitting both timer and interrogated meter readings.

I claim:

1. A system for reading a plurality of remotely located meters which meters are located at various points serviced by an enclosed fluid network and are adapted for measuring the flow of fluid from said network said system comprising:

(1) transmitting means operatively connected with said enclosed fluid network and adapted to transmit addressing sonic energy signals through the fluid in said enclosed fluid network, said addressing sonic energy signals identifying the meter to be read (2) receiving means operatively connected with each of said meters and said enclosed fluid network for receiving addressing sonic energy signals transmitted by said transmitting means and adapted to be actuated by a predetermined addressing sonic energy signal to convert the reading of the remotely located meter identified by said predetermined addressing sonic energy signal into a meter reading sonic energy signal (3) transmitting means operatively connected with said enclosed fluid network and each of said meters and adapted to transmit said meter reading sonic energy signal through the fluid of said enclosed fluid network (4) receiving means operatively connected with said enclosed fluid network for receiving the meter reading sonic energy signal and (5) means for recording the meter reading sonic energy signal received by the last named means.

2. A system for reading a plurality of remotely located meters, which meters are located at various points serviced by an enclosed fluid network and are adapted for measuring the flow of fluid from said network, said system comprising:

(1) transmitting means operatively connected with said enclosed fluid network and adapted to transmit addressing sonic energy signals through the fluid in said enclosed fluid network, said addressing sonic energy signals identifying the meter to be read (2) receiving means operatively connected with each of said meters and said enclosed fluid network for receiving addressing sonic energy signals transmitted by said transmitting means and adapted to be actuated by a predetermined addressing sonic energy signal to convert the reading of the remotely located meter identified by said predetermined addressing sonic energy signal into a meter reading signal of electrical pulses (3) means for converting said meter reading signal of electrical pulses into a meter reading signal of sonic energy pulses (4) transmitting means operatively connected with said enclosed fluid network and each of said meters and adapted to transmit the meter reading signal of sonic energy pulses through the fluid of said enclosed fluid network (5) receiving means operatively connected with said enclosed fluid network for receiving the meter reading signal of sonic energy pulses (6) means for converting said pulses of sonic energy into electrical pulses and (7) means for recording said electrical pulses.

3. A system for reading a plurality of remotely located meters, which meters are located at various points serviced by an enclosed fluid network and are adapted for measuring the flow of fluid from said network, said system comprising:

(1) transmitting means operatively connected with said enclosed fluid network and adapted to transmit addressing sonic energy signals through the fluid in said enclosed fluid network, said addressing sonic energy signals identifying the meter to be read (2) receiving means operatively connected with each of said meters and said enclosed fluid network for receiving addressing sonic energy signals transmitted by said transmitting means and adapted to be actuated by a predetermined addressing sonic energy signal to convert the reading of the remotely located meter identified by said predetermined addressing sonic energy signal into a meter reading signal of electrical pulses (3) means for encoding said electrical pulses by providing a pulse with a predetermined carrier frequency if the pulse represents a logical ONE and by providing a pulse with a different carrier frequency if the pulse represents a logical ZERO (4) means for converting each coded pulse to sonic energy at a predetermined frequency corresponding to the carrier frequency thereof to thereby provide coded pulses of sonic energy (5) transmitting means operatively connected with said enclosed fluid network and each of said meters and adapted to transmit the coded pulses of sonic energy through the fluid of said enclosed fluid network (6) receiving means operatively connected with said enclosed fluid network for receiving said coded sonic energy pulses and for converting each of said coded sonic energy pulses into a pulse of electrical energy at a corresponding frequency thereby providing coded electrical pulses (7) means for decoding said electrical pulses and (8) means for recording the decoded electrical pulses.

References Cited by the Examiner

UNITED STATES PATENTS

| | | |
|---|---|---|
| 2,677,790 | 5/1954 | Arps. |
| 2,858,983 | 11/1958 | Holtz et al. _________ 73—272 |
| 2,884,624 | 4/1959 | Endean et al. |
| 3,186,481 | 6/1965 | Foster. |
| 3,205,477 | 9/1965 | Kalbfell _________ 73—152 X |

DAVID SCHONBERG, *Primary Examiner.*